United States Patent
Benzschawel et al.

(10) Patent No.: US 7,529,703 B2
(45) Date of Patent: May 5, 2009

(54) METHOD AND SYSTEM FOR ARTIFICIAL NEURAL NETWORKS TO PREDICT PRICE MOVEMENTS IN THE FINANCIAL MARKETS

(75) Inventors: Terry L. Benzschawel, New York, NY (US); Chi Dzeng, New York, NY (US); Gregory A. Berman, Highland Park, NJ (US)

(73) Assignee: Citigroup Global Markets, Inc., New York, NY (US)

( * ) Notice: Subject to any disclaimer, the term of this patent is extended or adjusted under 35 U.S.C. 154(b) by 134 days.

(21) Appl. No.: 10/990,960

(22) Filed: Nov. 18, 2004

(65) Prior Publication Data

US 2005/0131790 A1    Jun. 16, 2005

Related U.S. Application Data

(60) Provisional application No. 60/520,659, filed on Nov. 18, 2003.

(51) Int. Cl.
*G06Q 40/00* (2006.01)
(52) U.S. Cl. .................................................. 705/36 R
(58) Field of Classification Search ................ 705/36, 705/36 R, 37; 706/15
See application file for complete search history.

(56) References Cited

U.S. PATENT DOCUMENTS

| | | | | |
|---|---|---|---|---|
| 3,680,355 | A * | 8/1972 | Goldstein et al. | 73/1.77 |
| 5,109,475 | A | 4/1992 | Kosaka et al. | 706/19 |
| 5,444,819 | A | 8/1995 | Negishi | 706/21 |
| 5,461,699 | A | 10/1995 | Arbabi et al. | 706/21 |
| 5,761,386 | A * | 6/1998 | Lawrence et al. | 706/20 |
| 5,761,442 | A * | 6/1998 | Barr et al. | 705/36 |
| 6,012,044 | A * | 1/2000 | Maggioncalda et al. | 705/36 R |
| 6,018,722 | A * | 1/2000 | Ray et al. | 705/36 R |
| 6,247,001 | B1 | 6/2001 | Tresp et al. | 706/15 |
| 6,272,474 | B1 * | 8/2001 | Garcia | 705/36 R |
| 6,363,333 | B1 | 3/2002 | Deco et al. | 702/191 |
| 6,401,082 | B1 | 6/2002 | Kropas-Hughes et al. | 706/26 |
| 6,735,580 | B1 | 5/2004 | Li et al. | 706/21 |
| 2002/0099636 | A1 | 7/2002 | Narumo | 705/36 R |
| 2002/0174056 | A1 | 11/2002 | Sefein et al. | 705/37 |

(Continued)

FOREIGN PATENT DOCUMENTS

WO    WO 02/061679    8/2002

OTHER PUBLICATIONS

Goodman, A., "Are Markets as Messy as They Look?", *Wall Street & Technology*, vol. 9, No. 9, pp. 23-29, May 1992.

(Continued)

*Primary Examiner*—Hani Kazimi
(74) *Attorney, Agent, or Firm*—George T. Marcou; King & Spalding LLP (57) ABSTRACT

The present invention relates to methods and systems for devising and implementing automated artificial neural networks to predict market performance and direction movements of the U.S. Treasury market, mortgage option-adjusted spreads (OAS), interest rate swap spreads, and U.S. Dollar/Mexican Peso exchange rate. The methods and systems of the present invention employ techniques used in actual neural networks naturally occurring in biological organisms to develop artificial neural network models for predicting movements in the financial market that are capable of extracting in a very consistent fashion non-linear relationships among input variables of the models that are readily apparent to the human traders.

16 Claims, 3 Drawing Sheets

U.S. PATENT DOCUMENTS

| | | | |
|---|---|---|---|
| 2002/0174081 A1* | 11/2002 | Charbonneau et al. | 706/15 |
| 2002/0178133 A1 | 11/2002 | Zhao et al. | 706/21 |
| 2003/0014378 A1 | 1/2003 | Goodnight et al. | 706/21 |
| 2003/0023525 A1 | 1/2003 | Chen | 705/35 |
| 2003/0093351 A1 | 5/2003 | Sarabanchong | 705/36 |
| 2003/0130899 A1* | 7/2003 | Ferguson et al. | 705/26 |
| 2003/0140023 A1* | 7/2003 | Ferguson et al. | 706/21 |
| 2003/0187772 A1* | 10/2003 | Papka | 705/36 |
| 2004/0093315 A1* | 5/2004 | Carney | 706/15 |
| 2004/0199451 A1 | 10/2004 | Benning et al. | 705/37 |
| 2004/0225598 A1 | 11/2004 | Goldberg et al. | 705/38 |

OTHER PUBLICATIONS

"NEC Has Workstation-Based Neural Net for Forecasting Share Price Movements," *Computergram International*, No. 1931, May 29, 1992.

Staley, M., et al., "Predicting the Canadian Spot Exchange Rate With Neural Networks," *Proceedings of the IEEE/IAFE Computational Intelligence for Financial Engineering*, pp. 108-112, 1995.

Campa, J.M., et al., "Testing the Expectations Hypothesis on the Term Structure of Volatilities in Foreign Exchange Options," *Journal of Finance*, vol. 50, No. 2, pp. 529(19), Jun. 1995.

Cheng, W., et al., "Artificial Neural Networks Make Their Mark as a Powerful Tool for Investors," *Review of Business*, vol. 18, No. 4, pp. 4-9, Summer, 1997.

El Shazly, M.R., et al., "Comparing the Forecasting Performance of Neural Networks and Forward Exchange Rates," *Journal of Multinational Financial Management*, vol. 7, pp. 345-356, 1997.

Pullman, B., "A 'Projectable Economic Rationale' for Short Term Currency Forecasting," *Global Investor*, No. 106, pp. 23-25, Oct. 1997.

Refences, A-P.N., et al., "Neural Networks in Financial Engineering: A Study in Methodology," *IEEE Transactions on Neural Networks*, vol. 8, No. 6, pp. 1222-1267, Nov. 1997.

Tsaih, R., et al., "Forecasting S&P 500 Stock Index Futures With a Hybrid AI System," *Decision Support Systems*, vol. 23, pp. 161-174, 1998.

Zhang, B-L, et al., "Multiresolution Forecasting for Future Trading Using Wavelet Decompositions," *IEEE Transactions on Neural Networks*, vol. 12, No. 4, pp. 765-775, Jul. 2001.

Militaru, V., "Neural Nets Can Fine Tune Trading Systems," *Futures*, vol. 33, No. 9, pp. 54-56, Jul. 2004.

Fama, E., "Efficient Capital Markets: A Review of Theory and Empirical Work," *Journal of Finance*, vol. 25, pp. 383-417 (1970).

Kean, J., "A Trading System for T-Bond Futures," *AI In Finance 1*, pp. 33-37, 1994.

T. Bass, "The Predictors," Holt and Company, New York, 1999.

Schleifer, A., "Inefficient Markets: An Introduction to Behavioral Finance," *Oxford University Press*, 2000.

Wilder, J., "New Concepts in Technical Trading Systems," Trend Research, Greensboro, NC, 1978.

Green, D. and Swets, J., "Signal Detection Theory and Psychophysics," Krieger Publishing, Huntington, New York, 1973.

Prendergast, J., "Predicting the Ten-Year LIBOR Swap Spread: The Role and Limitations of Rich Cheap Analysis," *Journal of Fixed Income*, vol. 10, No. 3, pp. 86-99, 2000.

Baygun, B., "Are Swap Spreads Predictable? Our Results are Encouraging," *Bond Market Roundup Strategy*, Salomon Smith Barney, Sep. 7, 2001.

International Search Report and Written Opinion for Application No. PCT/US04/38568, dated Sep. 19, 2005 (mailing date).

* cited by examiner

METHOD AND SYSTEM FOR ARTIFICIAL NEURAL NETWORKS TO PREDICT PRICE MOVEMENTS IN THE FINANCIAL MARKETS

PRIORITY

This application claims priority to the U.S. Provisional Patent Application No. 60/520,659, filed Nov. 18, 2003, entitled, "METHOD AND SYSTEM FOR ARTIFICIAL NEURAL NETWORKS TO PREDICT PRICE MOVEMENTS IN THE FINANCIAL MARKETS," which is herein incorporated by reference in its entirety.

BACKGROUND OF THE INVENTION

1. Field of the Invention

The present invention relates to the field of predicting directional movements in the financial markets. More specifically, the present invention relates to methods and systems for devising and implementing automated artificial neural networks to predict market performance and directional movements of U.S. Treasury yields, mortgage option-adjusted spreads (OAS), interest rate swap spreads, and the U.S. Dollar/Mexican Peso exchange rate.

2. Background

Despite the assumptions of the efficient markets hypothesis (Fama, E., *Efficient Capital Markets: A review of theory and empirical work*, Journal of Finance, Vol. 25, pp. 383-417 (1970)), there is evidence that price changes in the U.S. Treasury market and other financial markets do not occur randomly. There are also claims that a technical model exists which can predict market direction at above-chance levels (Kean, J. *A Trading System for T-Bond Futures*. AI in Finance 1, 1994, 33-37; also, see T. Bass, The Predictors, Holt and Company, New York, 1999). Further, studies in behavioral finance consistently find that equity investors under react to market information on short time scales that cause markets to trend, and overreact to long-term trends that result in reversion to average price levels (Schleifer, A. *Inefficient Markets: An Introduction to Behavioral Finance*, Oxford University Press, 2000).

SUMMARY OF THE INVENTION

Accordingly, the inventors have developed a computerized model to predict short-term directional movements in the U.S. Treasury market and other financial markets, such as changes in the U.S. Dollar/Mexican Peso exchange rate. The computerized model is based on a type of computing machine learning technique called an artificial neural network, which in turn is based on the biological functions of actual neural networks.

Actual neural networks occur naturally in biological organisms such as human beings. One prime example of a neural network is the human brain, which is composed of neurons, i.e. brain cells that process and store information. The neurons are connected together to form a neural network that further includes: 1) dendrites, which act as receivers of information for neurons, i.e., input terminals of the neurons; 2) axons, which are output terminals of the neurons for passing information from one neuron to another; and b) synapses, which are traffic nodes or selectors that reside on the path between neurons to inhibit or enhance the flow of information between the neurons.

Accordingly, the preferred embodiments of the present invention employ the techniques used in actual neural networks to develop an artificial neural network model (hereinafter, "neural network model") for predicting short-term directional movements in the financial markets, such as the U.S. Treasury market and other securities markets.

According to one embodiment of the present invention, there is provided a system and method for a neural network model that is capable of extracting in a very consistent fashion non-linear relationships among the model input variables (i.e., the correlation between the input variables) that are not readily apparent to the human traders in order to effectively predict directional movements in a particular financial market.

According to another embodiment of the present invention, there is provided a system and method for a multi-period neural network model that can simultaneously predict financial market movements for multiple time periods.

According to another embodiment of the present invention, there is provided an automated and consistent computerized system and method for financial trading by effectively predicting directional movements in the financial markets, wherein investors can trade daily and/or weekly and adjust the durations of their trading portfolios based on the market predictions.

According to another embodiment of the present invention, there is provided a system and method for a neural network model to predict directional movements in the short-term changes in the Mexican Peso/U.S. Dollar rate.

According to another embodiment of the present invention, there is provided a system and method for a neural network model to predict changes in the yield spread between mortgage backed securities and U.S. Treasury securities of similar duration.

According to still another embodiment of the present invention, there is provided a system and method for a neural network model to predict changes between the 10-year constant maturity sector of the U.S. Treasury model curve and the 10-year interest rate swap yields.

Additional aspects and novel features of the invention will be set forth in part in the description that follows, and in part will become more apparent to those skilled in the art upon examination of the present disclosure.

BRIEF DESCRIPTION OF THE DRAWINGS

The preferred embodiments are illustrated by way of example and not limited in the following figure(s), in which.

DETAILED DESCRIPTION OF THE PRESENT INVENTION

Reference is now made in detail to embodiments of the present invention, an illustrative example of which is illustrated in the accompanying attachments, in which like numerals indicate like elements, showing a method and system for developing and using neural network models to predict directional movements in the financial markets.

Figure 1:
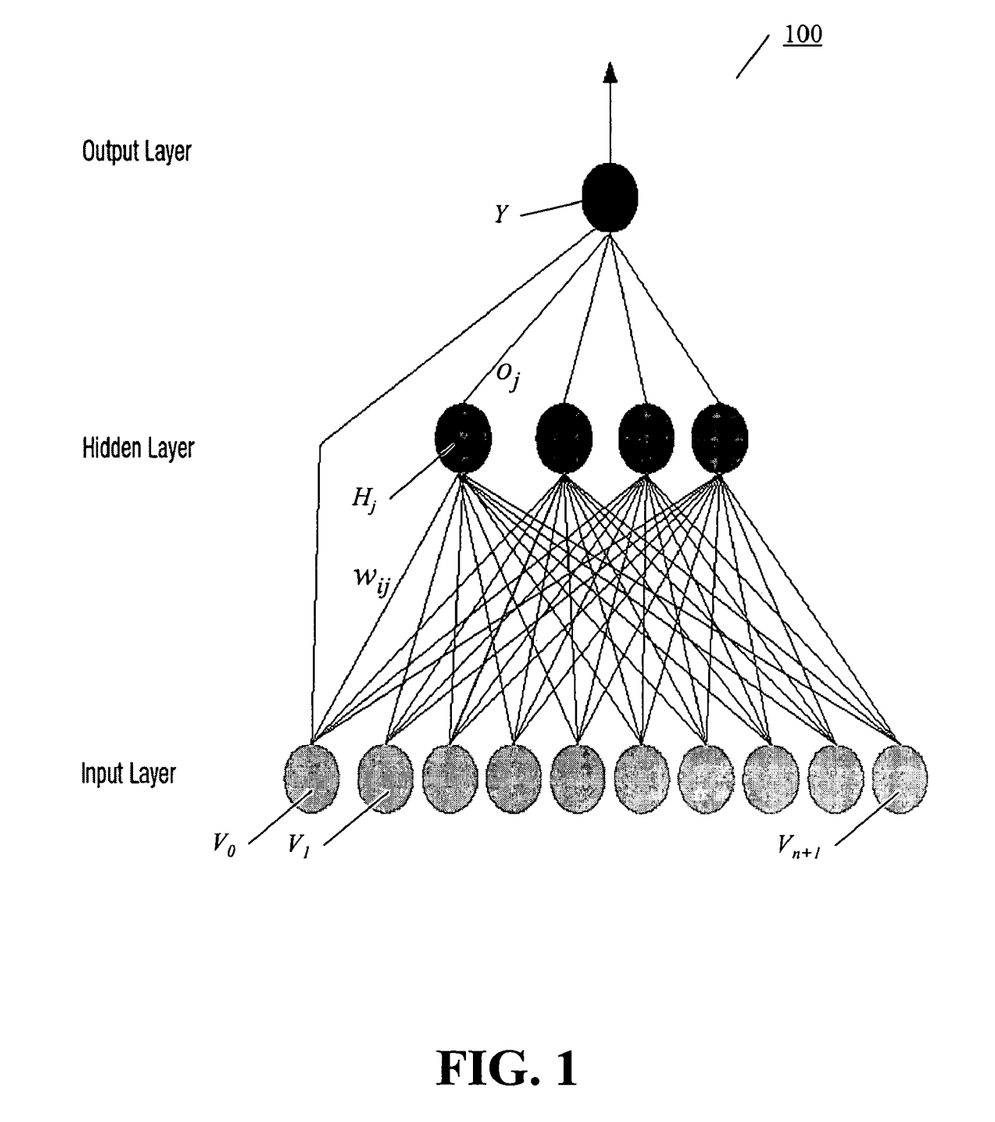
FIG. 1 depicts a schematic representation of a neural network model in accordance with an embodiment of the present invention.

As mentioned above, the term neural network refers to a model of a computing system inspired by studies of the brain. FIG. 1 shows a schematic representation of a neural network model 100 of the present invention. Although the neural network model actually comprises a set of equations or computations that specify weighted nonlinear transformations of input variable values, it can be represented by a number of processing elements organized in a hierarchical structure, having a high degree of connectivity among elements at different levels, as shown in FIG. 1. The network model 100 includes the following layers: 1) an input layer, which represents input market variables for the network, i.e., dendrites; 2) a hidden layer, which sums the weighted signals from each of the inputs prior to a nonlinear transformation (each input is weighted by a weighing or scaling factor that transforms the input, i.e., a synapse); and 3) an output layer, which sums the weighted outputs of the hidden layer and produces the network output response.

A number of programming routines or modules can be devised to include program codes representing the processing elements in the input, hidden, and output layers in the network 100 and their interconnectivities. For instance, a programming routine or module can be devised to represent one of the processing elements $H_j$ and its various connections to $V_0$, $V_1, \ldots, V_{n+1}$. The program codes may include codes from any suitable computer-programming language, such as C, C++, C#, or the like. Further, such programming routines or modules can be implemented in one or more computer server devices. Each such computer server device can include a processor coupled to a memory device such as a computer-readable medium, which can be used to store the programming routines or modules for the processing elements in the network 100. Further, each computer server devices can be a single computer or a network of computers. Thus, such computer servers can be, e.g., mainframe computers, networked computers, processor-based devices, or any similar types of systems and devices.

Embodiments of computer-readable media include, but are not limited to, an electronic, optical, magnetic, or other storage or transmission device capable of providing the processor in the computer server device with computer-readable instructions for implementing artificial neural network models. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless.

An important feature of the neural network model is its ability to alter its connectivity in response to input to the network. One method for doing this is to train the neural network using the backpropagation or gradient descent method on historical data. For example, on each learning trial, the network is presented with a set of input variables and a known change in the price of the financial instrument to be predicted. The data is input to the network and the network response is noted. To the extent that the network response does not match the actual known outcome, the neural network connections, i.e., the weighted factors, are adjusted in proportion to their abilities to reduce the error in the predicted price change. The theoretical bases for training backpropagation neural networks are described in statistical literature on nonlinear regression and known in the art; therefore, it is not further described herein.

Successful model construction of a backpropagation neural network is also dependent on the availability of a learning sample with enough cases to enable setting the many connections in the network without overfitting. The model building efforts for a neural network applicable to the U.S. Treasury T-bond market is described next with reference to FIG. 2 and in accordance with an embodiment of the present invention.

The U.S. Treasury T-bond Market Neural Network Model

Figure 2:
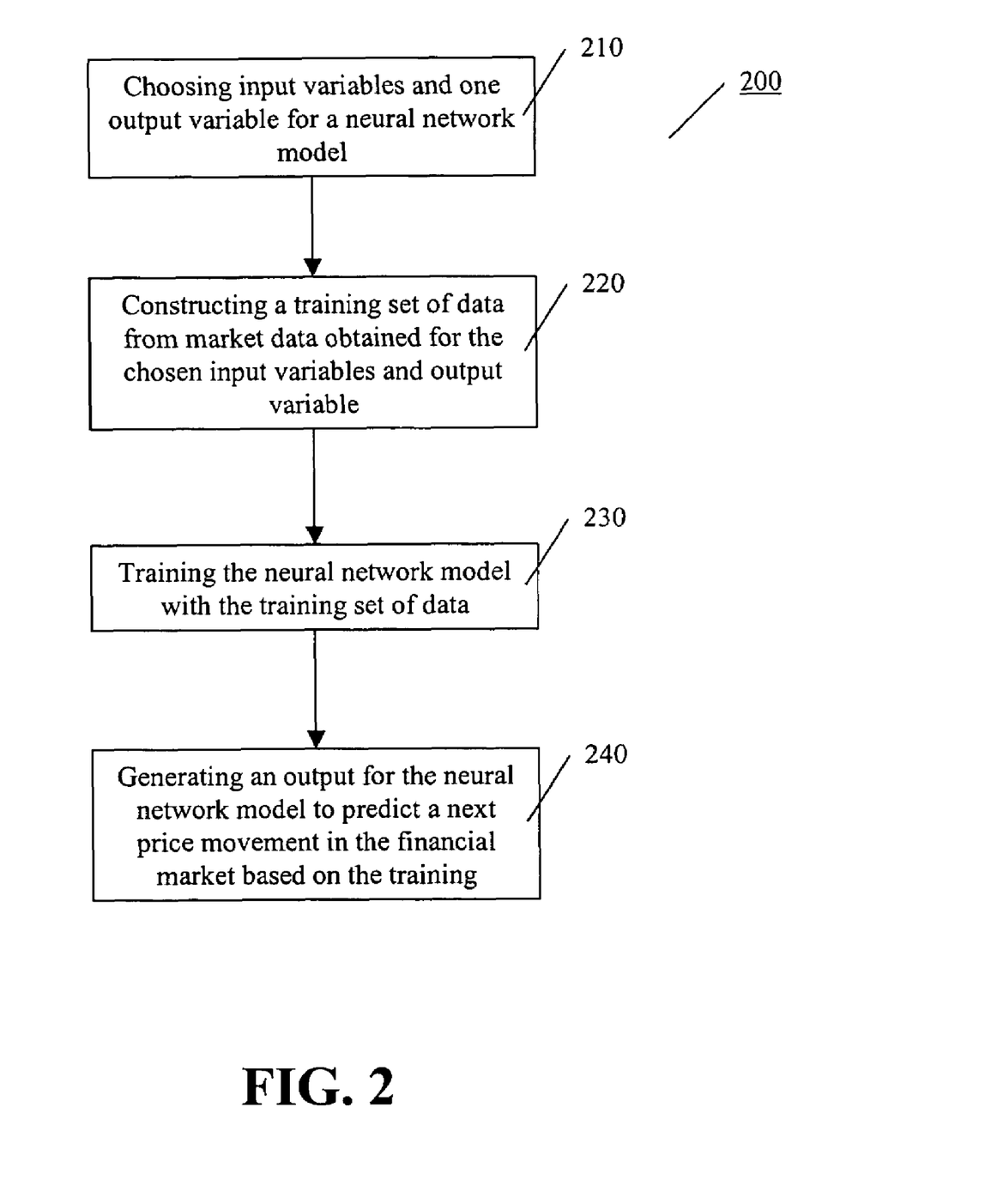
FIG. 2 depicts a process for building a neural network model for financial market, such as the U.S. Treasury T-bond market, in accordance with an embodiment of the present invention.

Referring to FIG. 2, at 210 a plurality of input variables and one output variable representing a price change, i.e., a market change, are chosen for the Treasury market (30-year T-bond) model. The input variables include, but are not limited to: raw market bond price series, equity indices, foreign exchange rates, and technical stochastic indicators that are known in the art to be important predictors of U.S. Treasury market price moves. In addition, ratios of short-term changes in variables and other statistics can be computed on some of these quantities before inputting them to the network. For instance, some variables are momentum variables, such as: 1) previous-day price, change in price; 2) relative strength indicator (i.e., a ratio of up movement relative to down movement of the market in the last, e.g., 14 days; e.g., average number of days market went up relative to average number of days the market went down; average value that it went up relative to average value that it went down). Examples of other variables include: 1) the slope of the T-Bond yield to that of the T-Note; 2) previous change in a particular market variable, e.g., the T-Bond (let say the one-day change in the T-Bond, between yesterday and today, over the 11-day standard deviation of the T-Bond price changes); 3) the six-day change in the T-Bond yield; 4) the six-day change in the NASDAQ over the six-day change in the T-Bond yield; 5) the six-day change in the S&P over the six-day change in the T-Bond yield; 6) change in the trade-weighted dollar over the six-day change in the T-Bond; 7) Yield levels of the T-Bill; 8) last 10 days of prices. It should be noted that variables vary for each particular market model being constructed.

Table 1 provides a non-inclusive list of market quantities that can be used to compute input variables for each particular market model construction, wherein such input variables may be derived without undue experimentation based on the present disclosure by one skilled in the art.

Daily Quantities to Compute Variables of the ED8 Bundle
(First 8 Eurodollar Futures Contracts)

10-Year Constant Maturity US Treasury Bond Yield
2-Year Constant Maturity US Treasury Bond Yield
S&P 500 Stock Market Index
NADSAQ Stock Market Index
First Two Fed Futures Contract Prices
Daily Quantities to Compute Variables for US 10-year
Treasury Bond Neural Network Model Price of the Lead US Treasury 10-Year Note Futures Contract
10-Year Constant Maturity Treasury Yield
1-Year Constant Maturity Treasury Yield
Trade-Weighted Value of US Dollar
S&P 500 Stock Market Index
NADSAQ Stock Market Index
Daily Quantities to Compute Variables for US 30-year
Treasury Bond Neural Network Model Price of the Lead US Treasury Bond Futures Contract
30-Year Constant Maturity Treasury Yield -continued 1-Year Constant Maturity Treasury Yield
Trade-Weighted Value of US Dollar
S&P 500 Stock Market Index
NADSAQ Stock Market Index
Daily Quantities to Variables for MnP/$
Neural Network ModelCompute MnP/$ Exchange Rate
3-Month US$ LIBOR Rate
28-Day Mexican Cete Rate
365-Day Mexican Cete Rate
Value of the Mexican Bolsa
Value of the Trade-Weighted US Dollar
30-Day MnP/$ Put Volatility
30-Day MnP/$ Call Volatility
Wilshire 5000 Stock Index
West Texas Intermediate Crude Oil Spot Price
Average Spread of Mexican Sovereign Dollar-Denominated Bonds
Average Spread of Emerging Markets World Index
Daily Quantities to Compute Variables for Mortgage
OAS Neural Network Model Mortgage OAS to the US Treasury Curve
Equity Option Volatility from the CBOE (VIX)
NASDAQ Index Value
Mortgage Base Lending Rate
2, 5 and 10-Year Swap Spreads to the US Treasury Curve
US Treasury 2-Year Constant Maturity Yield
US Treasury 10-Year Constant-Maturity Yield
Daily Quantities to Compute Variables for 10-Year
Swap Spread Neural Network Model 10-Year Swap Spread to US Treasury Model Curve
2-Year Swap Spread to US Treasury Model Curve
Japanese Yen/US Dollar Exchange Rate
S&P 500 Equity Index Value
NASDAQ Equity Index Value
10-Year Constant Maturity Treasury Yield
2-Year Constant Maturity Treasury Yield
First Two Fed Futures Contract Prices In building a neural network model, many choices are made. Through systematic procedures, one can choose how many years of learning data to use to generate predictions, whether to make the dependent variable continuous or binary, whether to exclude cases having small price changes from the training set, the number hidden nodes, how many iterations through the training set for learning, and so forth.

Accordingly, at 220, a training set of data for the chosen input variables and output variable is obtained and constructed over a predetermined minimum sample time period, i.e., the training period. The training set of data may be obtained through a data network and stored in a server memory, such as a CRM as described earlier or a computer database accessible by one or more processors that train and/or execute neural network models.

At 230, the neural network model is trained with the training set of data.

At 240, once the neural network model is trained, it can provide an network output that predicts a future price movement in the T-bond market and a proposal to buy, sell, or stay in such market, as described below.

Figure 3:
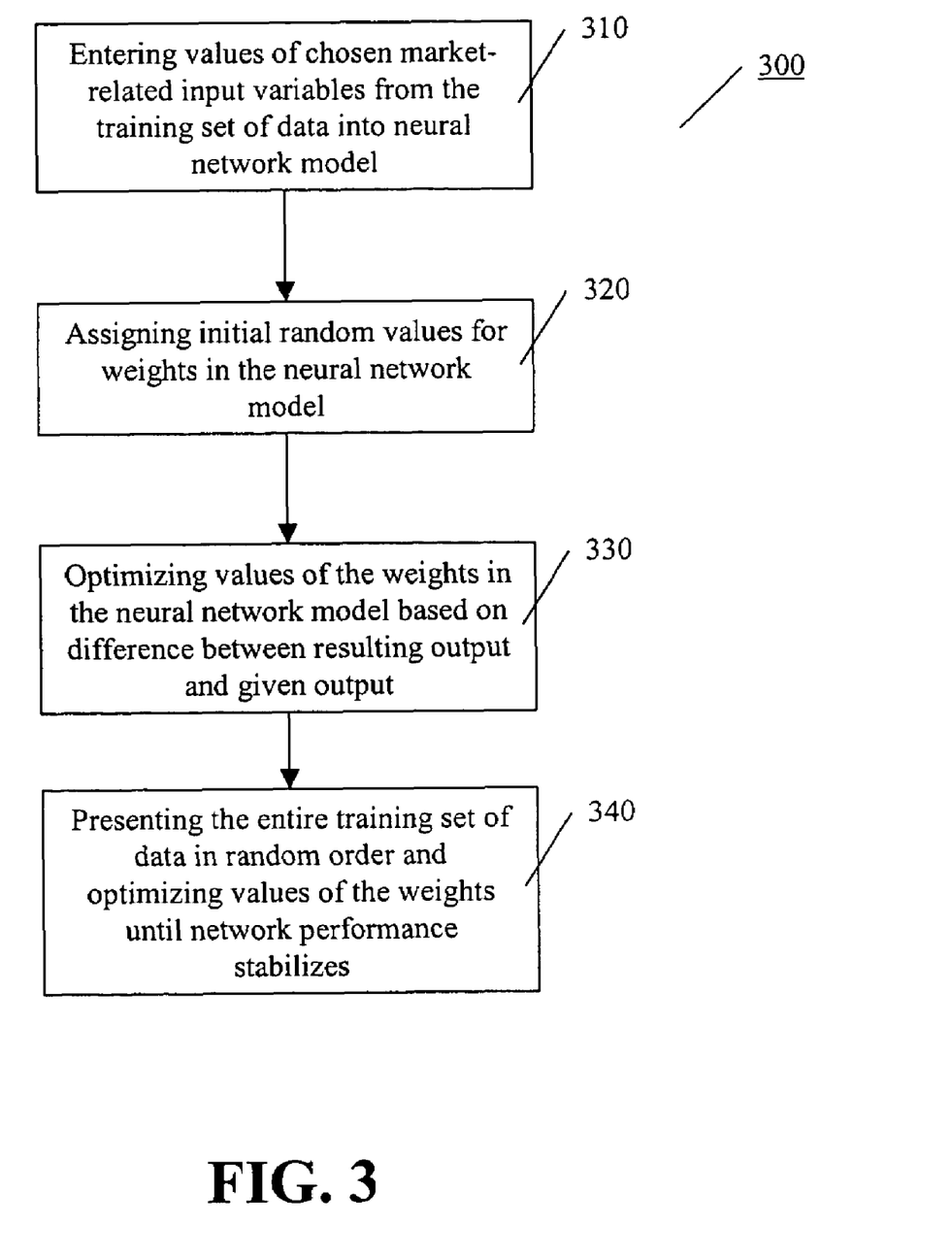
FIG. 3 depicts a process for training a neural network model in accordance with an embodiment of the present invention.

The training of the neural network model at 230 is now described with reference to 300 in FIG. 3. At 310, values of chosen market-related input variables (i.e., input variables) for a given trading day are presented or input to the network. At 320, initial random values are assigned to the weights in the neural network model. At 330, from calculations of the chosen values for the input variables and weights by the neural network model, the difference between the given output (i.e., output variable) of the network and its desired output (i.e., the actual market move from the training data) is back-propagated by adjusting slightly each of the weights in the network in proportion to their ability to reduce the output error, i.e., optimizing the weights. At 340, the entire training set is presented repeatedly in random order until network performance stabilizes through optimization of the weights in the neural network model. As noted earlier, the technique is called the gradient descent method of error backpropagation, which can be implemented via a server device as described earlier. In simplified terms, the gradient descent method aims at small, step-wise reductions in model errors by feedback adjustments (trainings) based on adjustments of each of the weights in the model. The purpose is to optimize the model's performance in predicting already-known market movements in order to effectively predict future market moves. Thus, the gradient descent method is used to set the weights of the neural network model, using as training data a set of daily technical indicators and the resulting future price change over a predetermined minimum sample time period (training period).

Each case in the training set of data comprises values for the set of predetermined input independent variables paired with a known price change (i.e., the dependent variable) for a time period to be predicted (e.g., a 12-day price change). Values for the dependent variables (i.e., output variables) used to train and test the network are set to one (1) if the subsequent 12-day price changes is a BUY (B) signal and a SELL (S) signal if the actual price changes are negative. Thus, the network is trained to discriminate between cases for which the price goes up and cases for which the price goes down without regard to the magnitude of those changes. Because the network is trained to discriminate periods of positive price movements from negative price movements, cases having relatively small positive or negative price changes may be eliminated from the training sample.

Values for the input variables, $V_i$, i=0, ... ,n comprise the input layer of the neural network 100, as shown in FIG. 1, with (n+1) input variables, wherein n is an integer. Input $V_o$ is the bias term whose value is always 1.0. The value of each input variable is scaled relative to the minimum and maximum in the sample, $V_{min(i)}$ and $V_{max(i)}$, respectively, to give values of $X_i$ between zero and one (i.e., normalized to one). The scaled inputs, $X_o, \ldots, X_n$, are then multiplied by the weights, $w_{ij}$. Each $w_{ij}$ is the coefficient (represented by a line connecting a circle in the input layer to a circle in the hidden layer) applied to the ith variable value input (represented by each circle in the input layer) to the jth hidden node (represented by each circle in the hidden layer) in FIG. 1. The weighted inputs to each of the j hidden nodes are summed to give a signal, $I_j$, to which a sigmoidal transfer function of the form:

$$H_j = \frac{1}{1 + e^{-I_j}}$$

is applied to give $H_j$, the output of the jth hidden node. The $H_j$s and the bias are then multiplied by the weights, $o_j$, on the outputs of the hidden nodes and summed at the single output node to give Y, the neural network output score.

The actual number of processing elements in the hidden layer (i.e., the $H_j$s) can be determined through an iterative process of training and subsequent testing. Training proceeds by presenting a case from the learning sample to the network and computing the difference in network output, Y, from the value of the dependent variable for that case. Note that although the dependent variable is a zero or one for a price decrease or increase, respectively, the output of the network, Y, is a continuous variable. The network weights are then adjusted using the delta rule, as understood in the art, whereby the $w_{ij}$s and $o_j$s are changed by amounts proportional to their contributions to reducing the error. Hence, as noted earlier, the neural network model really comprises a series of quarterly models with a new set of network weights developed for each subsequent quarter over the training period, with each successive period incorporating for training an additional quarter of data.

Following the training procedure for a given network configuration, another arrangement of hidden nodes and/or learning parameters is chosen and the training process is repeated. Hence, the actual neural network model includes not just one but a plurality of structures similar (but not identical) to the structure shown in FIG. 1. In a preferred embodiment, the weights for a predetermined number of networks, e.g., 13 networks, are generated using the same structure of nodes, learning data, number of trials, etc., but the initial random weights assigned to the connections for each network are generated using different random seeds. This results in 13 models that each produce different output scores on a given day and the ensemble of scores are combined for prediction. That is, although each of the 13 models produces a continuous output score, that output goes through a series of transformations, as described later, that ultimately result in the generation of one of three signals: BUY (B), SELL (S), or NEUTRAL (N). As an example, for ease of exposition, a trade of one-unit is the equivalent of $100,000 face of U.S. Treasury bonds (for the Mexican Peso/U.S. Dollar exchange rate model, one unit is the equivalent of $1 Million worth of Mexican Pesos).

According to one embodiment of the present invention, the neural network model comprises a series of quarterly models with a new set of network weights developed for each subsequent quarter (i.e., three-month period) over the training period, with each successive period incorporating for training an additional quarter (i.e., three months) of data. Thus, the above historical backtesting continues with model parameters being recalculated each quarter with additional data from the prior one. After systematic variation of the number of hidden units beginning with a single one and proceeding until no further improvement occurs, the network that performs best is chosen as the solution for each of the 13 models.

The neural network outputs (i.e., values for y), range from about −0.2 to 1.2, but are transformed to integer-valued scores as follows. The network scores on the training sample are sorted by magnitude from highest to lowest and divided into 20 equal-density bins from 20 to 1. Each change in 5-percentile bin then represents an equal change in ranked training population density. Bin limits are computed at the midpoints between cases that straddle bin boundaries. In this way, the continuous outputs of each network are transformed into discrete integer scores from 1-20, called N-scores. The integer scores are used to generate a B signal from a given one of the models if its transformed output is greater than 15, an S signal if its transformed output is less than 6, and an N signal if its transformed output is between 6 and 15.

At the close of any given trading day, values for the input variables are fed into each of the 13 models and the output signal is calculated as explained above. If 7 out of the 13 models have a B signal (i.e., a majority), one unit of trading is added to the current position (i.e., go long). If the majority of the 13 models have an S signal, one unit of trading is subtracted from the current position (i.e., go short). If the majority of the 13 models have an N signal, the position remains neutral with no unit addition or subtraction. However, if any trade was done on the 12th-previous business day, that trade is unwound at the current day's close. Thus, on any given day, the maximum number of units that can be traded under this rule is two units: one new position, and an unwinding of a previous one. Similarly, on any given day, the maximum size of the position can be long or short 12 units.

Software can be developed to convert values of Y to N-scores and to compute the number of Up-cases and Down-cases in the test sample for each N-score. To the extent that the model is discriminating upward price movements from price decreases, test cases associated with subsequent price rises should tend to have higher scores and vice versa. Cumulative probabilities as functions of bin number are computed for each class. Under present conditions, the probabilities of hits (price increases with N-scores above 10) and false positives (price decreases with N-scores above 10) are identical to the cumulative probabilities. During model optimization, hit and false positive probabilities as well as P/L are used to evaluate network performance. Models that perform better will have a greater number of hits for a given rate of false positives and the best model is that which produces the largest daily return per unit of volatility in daily return (i.e., the Sharpe ratio).

The U.S. Treasury T-Note Market Neural Network Model

The usefulness of neural networks for predicting price changes in the T-bond market is also applicable for predicting changes in the U.S. Treasury T-note market. The procedure for constructing and using the T-note neural network model is similar to that described above for the T-bond market, wherein the same trading strategy of one unit per day can also be used for the historical simulations of the T-note trading. The inventors have found that changes in T-note and T-bond yields are highly correlated. However, to the extent that they are independent, trading in both markets can, through diversification, increase the overall daily and quarterly Sharpe Ratio from that by trading either model alone.

The 1-day Model

Although historical and actual trading results are encouraging, signals from the original 12-day model are not able to change with frequency sufficient to provide investors the flexibility they desire to adjust positions in response to rapidly changing market conditions. In an attempt to make the model more useful for such applications, several trading strategies are evaluated to provide more frequent entry and exit points for clients considering investing based on model predictions. One particular strategy, hereinafter referred to as the 1-day model, generates historical Sharpe Ratios that are equivalent to those of individual and combined 12-day T-bond and T-note models. Furthermore, using the 1-day strategy in combination with the 12-day strategy improves the overall Sharpe Ratio.

Recall that the aforementioned method involves transforming each of the 13 networks' real-valued output scores to an integer value between 1 and 20. The integer scores were used to generate a B (for BUY) signal from a given model if its signal was greater than 15, an S if it was less than 6, and an N signal if it was between 6 through 15. Then, if any 7 out of the 13 models had B or S signals (i.e., a majority), a one-unit long or short position can be executed that day. For the 1-day model, instead of taking the majority of votes, the average of the scores on the 1-20 scale can be computed, e.g., by a server device mentioned earlier, and used as the decision variable for that day. For example, the daily position size is calculated from the average score from the 13 models as:

Position=INT {12*[(Avg NScore−10)/9.5]}, where INT stands for rounding to the nearest integer, Avg NScore is the average score, and 12 is the unit-trade scaling variable that equates the 1-day position to the 12-day model where the convention is that the unit trade equals $100,000 face of bonds or notes.

The performance of the 1-day and the current 12-day models are compared—both individually and when used in a combined trading strategy. It is found that the original 12-day majority vote model has a Sharpe Ratio of 1.00 over the period and that the 1-day model has a Sharpe Ratio of 1.05, with both models producing roughly the same amount of excess P/L. When trading on both 1-day and 12-day majority voting strategies, the Sharpe Ratio improves to 1.1, again demonstrating gains from uncorrelated predictions from different trading strategies. Thus, not only is it possible for an investor to use only the 1-day model alone without decreased predictability, but when using it in combination with the 12-day model, it could improve risk-adjusted returns by 0.1.

Thus far, only a few of many potential strategies for trading on neural network model signals are examined. Other alternative strategies can involve lengthening or shortening duration of a portfolio of fixed-income securities. For example, one way to turn a model's signal into a signal about duration is to express it relative to a benchmark portfolio equally weighted between Treasury bonds and cash. Regardless of the underlying strategy for determining BUY, SELL or NEUTRAL signals, if the current number of unit-trades is 0, the position is set to 50% cash and 50% bonds. Accordingly, if the current number of unit-trades in position is positive (i.e., a long duration signal), proportionately more investment is allocated to the long bond and cash investment is reduced. Thus, if the net unit-trades in position were at its maximum positive value, 100% of the investment should be in bonds. Conversely, if the current number of unit-trades in position is negative (i.e., a short-duration signal), proportionately more cash investment is made and the position in bonds is reduced. Thus, if the net position is at its maximum negative value, the entire investment should be in cash.

Mexican Peso/U.S. Dollar Exchange Neural Network Model

Based on the construction of a neural network model for the U.S. Treasury market, a neural network model can also be constructed for predicting directional movements in the short-term changes (10-day exchange rate) in the Mexican Peso/U.S. Dollar exchange rate, hereinafter referred to as the MnP/$ rate, as described next.

Based on an extensive testing procedure, a plurality of independent variables were chosen as inputs to train the MnP/$ neural network model, wherein several types of market values were selected as the basis for generating predictor variables: daily MnP/$ rates, local Mexican market interest rates and Mexican equity values, US interest rates, US equity, and commodity values, and dollar-denominated Emerging markets' asset values. According to one embodiment of the present invention, some variables are selected solely based on input from currency traders. For all other candidate variables, changes in the Peso/$ rate versus changes in the variable are regressed. If, over significant periods of time, a positive and/or negative correlations is found between the value of the candidate variable and changes in the exchange rate, such variable is then used in the Mn/$ neural network model. Ten different inputs to the model were constructed via a variety of transformations of daily MnP/$ rates prior to the prediction date (T). For example, the 14-day relative strength indicator (RSI) for the MnP/$ rate as described by Wilder (Wilder, J. *New Concepts in Technical Trading Systems*, Trend Research, Greensboro, NC, 1978) is one such variable constructed from MnP/$ rates. Another five variables were constructed as transformations of daily Mexican Cete rates of various maturities, the daily value of the Bolsa (Mexican equity market index) and Peso put/call ratios. Four variables were constructed from daily 3-month US LIBOR rates, the Wilshire 5000 index of US equities, West Texas Intermediate crude oil spot prices, and the strength of the trade-weighted US dollar. Finally, two variables were based on values of the Emerging Markets World Index (EMWI, an internal Salomon Smith Barney Index that is composed of both Brady Bonds and Eurobonds that have amounts outstanding greater that 100 MM face and are not in default) and the average stripped spread of Mexican dollar-denominated sovereign debt. Thus, the total number of input variables to the model is twenty-one and the dependent variable for a given day, T, was the difference between the MnP/$ rate on day T and that exchange rate twelve business days later (i.e., at T+12).

To construct learning and testing samples for the MnP/$ neural network model, data for the 22 variables (15 inputs and 1 output) were assembled from historical data recorded over a predetermined period of time; for example, from Jan. 10, 1996 to Sep. 25, 2001. The data from Jan. 10, 1996 through Apr. 30, 1999 is used to train the network (i.e., the learning sample). To construct the learning sample, each case (21 independent variables and a dependent variable for a given date) from the learning sample period was ranked based on the magnitude of the 12-day change in MnP/$ rate (the dependent variable). It was found that the middle 135 cases were having relatively small positive and negative values for the dependent variable; therefore, they were removed. This left 700 cases in the learning sample, with 350 cases for which the 12-day MnP/$ rate became larger (i.e., the Peso weakened) and 350 cases for which the MnP/$ rate decreased (i.e., the Peso strengthened). To test the model after it was constructed, all 602 cases of daily data between May 3, 1999 and Sep. 25, 2001 were used regardless of the magnitude of the 12-day change in the MnP/$ rate. Thus, the test cases were out-of-sample with respect to the learning set and occurred later in time than any of the learning cases.

To train the MnP/$ neural network model, a model structure having 22 input nodes (the 21 input variables and a Bias variable always set to 1.0), several hidden nodes, and a single output node is implemented. The backpropagation method is used for adjusting the model coefficients and learning rates, just as it was used earlier to construct neural network models for the US Treasury market. The model was trained using a 50,000 learning trials, with each trial consisting of a presentation of a learning case (sampled at random without replacement until the entire learning sample is exhausted and then restored once again). After the 50,000 trials, training was halted and the 602 test cases were presented once to the network for scoring. The output of the model for each test case was a single real-numbered value between −0.2 and 1.2 and whose magnitude is presumably related to whether the 12-day change in the MnP/$ rate was positive (weakening Peso) or negative (strengthening Peso).

For purposes of analyzing the results of the trained model, the MnP/$ neural network model can be thought of as consisting of two models: one for predicting when the Mexican Peso will strengthen relative to the US Dollar, and one for predicting when the Peso will weaken. To evaluate the model for predicting Peso strengthening, the real-valued outputs of the MnP/$ neural network model were ordered from highest to lowest. Each value had associated with it a dependent variable value indicating whether (and how much) the Peso strengthened or weakened for that test case. For each ranked test case, an examination is performed to determine whether its associated dependent variable was a "strengthen" (s) or a "weaken" (w). If the model were perfect, all the strengthening cases would have neural network scores greater than all the weakening ones. That is, in the list of cases ranked by network scores, a perfect model would rank all "strengthening" cases higher than "weakening" ones. The discriminatory power of less than perfect models can be evaluated by calculating the percentage of hits (i.e. percentage of all "strengthening" cases at or above the given rank) as a function of false alarms (i.e. percentage of all "weakening" cases at or above the given rank). The results of such an analysis can be displayed in a plot called a receiver operating characteristic or ROC (as described in Green, D. and Swets, J. *Signal Detection Theory and Psychophyisics*, Krieger Publishing, Huntington, New York, 1973).

Having constructed this neural network model and examined its results, in one embodiment of the present invention, the MnP/$ neural network model is implemented, wherein spot rates at T+12 are used as the dependent variable for the model, ignoring that the carry will usually differ between the Peso and the US Dollar (e.g. interest rates for financing in US Dollars are usually much lower than those for financing in Mexican Pesos). To correct this difference, the T+12 spot rates are converted to the forward rates using the prevailing US and Mexican short rates at time T. In another embodiment of the present invention, the change in the MnP/$ rate at T+10 can be used in place of the current dependent variable at T+12. That is, the current T+12 (business day) variable sometimes spans 14 actual days and sometimes spans 16 actual days, incurring differing costs of carry. Switching to T+10 as the dependent variable can be an improvement (if performance is not adversely affected by shifting the time period of prediction) because the number of actual days spanned would almost always be 16 (except for T+10 periods that contain holidays). Further, a series of optimization runs can be done to determine the best combinations of the number of hidden nodes, number of learning trials, and learning rates to optimize the MnP/$ network structure.

Mortgage OAS Neural Network Model

Based on the construction of a neural network model for the U.S. Treasury market, a neural network model can also be constructed for predicting changes in the yield spread between mortgage backed securities and U.S. Treasury securities of similar duration. This spread is approximated using mortgage option-adjusted spread (OAS). As understood in the art, the OAS spread differ from the actual yield spread in that each expected cash flow of the mortgage security is discounted at the spread to the U.S. Treasure curve at the point when it is to be received, and the values of any embedded options contained in the bond are included explicitly in the calculated price. Therefore, the neural network model to be constructed is hereinafter referred to as the mortgage OAS model, as further described next.

Based on an extensive testing procedure, a plurality of independent variables were chosen as inputs to train the mortgage OAS neural network model, wherein three general types of variables were selected: mortgage OAS-based technical variables, equity market variables, and variables from the fixed income markets excluding mortgage OASs. The six mortgage OAS-based inputs to the model were constructed as various transformations of the mortgage OAS values from the previous 14 business days. For example, the 14-day relative strength indicator (RSI) described by Wilder (Wilder, J. *New Concepts in Technical Trading Systems*, Trend Research, Greensboro, NC, 1978) is one such transformation. There were four equity market based variables that were derived through various transformations of daily S&P500, NASDAQ and CBOE prices. Finally, the five fixed income variables were transformations of daily Mortgage base-rates, two-, five- and ten-year swap rates, and two-year and ten-year constant maturity US Treasury yields. Thus, the total number of input variables was fifteen and the dependent variable for a given day, T, was the difference between the mortgage OAS on day T and twelve business days later (i.e., T+12).

To construct learning and testing samples for the mortgage OAS neural network model, data for the 16 variables (15 inputs and 1 output) were assembled from historical data recorded over a predetermined period of time; for example, from Feb. 5, 1988 to Aug. 30, 2001. The data from Feb. 5, 1988 through Dec. 31, 1996 is used to train the mortgage OAS neural network model (i.e., the learning sample). To construct the learning sample, each case (15 independent variables and a dependent variable for a given date) from the learning sample period was ranked based on the magnitude of the 12-day change in mortgage OAS (the dependent variable). It was found that the middle 600 cases were having relatively small positive and negative values for the dependent variable; therefore, they were removed. This left 1651 cases in the learning sample, with 826 cases for which the 12-day OAS change was wider and 825 cases for which the OAS narrowed. To test the mortgage OAS model after it was constructed, all the 1176 cases of daily data between the Jan. 2, 1997 and Aug. 30, 2001, were used regardless of the magnitude of the dependent variable change. Thus, the test cases were out-of-sample with respect to the learning set and occurred later in time than any of the learning cases.

To train the mortgage OAS model, a model structure having 16 input nodes (the 15 input variables and a Bias variable always set to 1.0), several hidden nodes, and a single output node was implemented. The backpropagation method for adjusting the model coefficients and learning rates was used, just as it was used earlier to construct models for the US Treasury market. The mortgage OAS model was trained using a 100,000 learning trials, with each trial consisting of a presentation of a learning case (sampled at random without replacement until the entire learning sample is exhausted and then restored once again). After the 100,000 trials, training was halted and the 1176 test cases were presented one time to the network for scoring. The output of the model for each test case was a single real-numbered value between −0.2 and 1.2 and whose magnitude is presumably related to whether the 12-day mortgage OAS change will be a widening (higher value) or narrowing (lower value).

For purposes of analyzing the results of the trained model, the mortgage OAS neural network model can be thought of as including two models: one for predicting when the market will widen (Widening model), and one for predicting when the market will narrow (Narrowing model). There are two methods for evaluating the performance of the mortgage OAS model. The first method involves an evaluation of the conditional probability of the model generating a correct signal (for either the Widening or Narrowing model) as a function of the given criterion signal strength specified in terms of the conditional probability of making an error. The second method involves computing for a given criterion signal strength (i.e.

neural network score) the odds of the network signal correctly signaling the Widening or Narrowing in mortgage OAS. These methods are described below.

To prepare the network outputs for analysis, the network scores were sorted from highest to lowest and each score was paired with the known change in mortgage OAS (narrowing or widening) that actually occurred for that case. For each network-score ranked test case, it is then known whether its associated dependent variable was a "wide" (w) or a "narrow" (n). If the model were perfect, all the wide cases would have neural network scores greater than all the narrow ones. That is, in the list of cases ranked by network scores, a perfect model would rank all "wide" cases higher than "narrow" ones. Of course, the model is not perfect and both narrowings and widenings were scattered throughout the range of scores. However, the model is a predictor to the extent that "widenings" tend to have greater network scores than "narrowings". This ordered set is then used to evaluate the degree of predictability.

To evaluate the predictive power of the mortgage OAS Widening model, the percentage of hits (i.e. percentage of all "wide" cases at or above the given rank) as a function of false alarms (i.e. percentage of all "narrow" cases at or above the given rank) is calculated. That is, when a false alarm is encountered in the ordered sample, the cumulative frequency of false alarms and that cumulative frequency of hits are calculated. This was continued until the entire ranked sample was exhausted. It is customary to plot the results of such an analysis in a receiver operating characteristic or ROC.

Having constructed this neural network model and examined its results, in one embodiment of the present invention, the mortgage OAS neural network model can be implemented for trading in the U.S. Treasury market. First, the 12-day change in volatility-adjusted mortgage OASs is used as the dependent variable. To trade reliably on such a model would require the daily hedging of OAS volatility. Because this would add expense to trading on the model, the 12-day change in fixed-volatility OASs is used instead as the basis for model predictions. In addition, a variable related to US Treasury volatility can be added. Preliminary testing has shown that variable to have some explanatory power regarding changes in mortgage OASs (This is the option-implied volatility of the ten-year Treasury note).

Interest Rate Swap Spreads Neural Network Model

Based on the construction of a neural network model for the U.S. Treasury market, a neural network model can also be constructed for predicting changes between the 10-year constant maturity sector of the U.S. Treasury model curve and the 10-year interest rate swap yields, hereinafter referred to as the 10-year swap spread (10YSS) model, which is described next.

Independent variables to train the 10YSS neural network model are variants of the set of variables used to train the neural network Treasury market models, wherein several types of market values were selected as the basis for generating predictor variables: daily swap market and treasury curve yields; the Japanese Yen/US Dollar exchange rate; US domestic equity indexes; and a variable that represents the current Federal Reserve Open Market Committee bias toward easing or tightening. Sixteen different inputs to the model were constructed via a variety of transformations of daily 10-year and/or 2-year swap spreads prior to the prediction date (T). For example, the 14-day relative strength indicator (RSI) for the 10YSS, as described by earlier-cited Wilder, is one such variable constructed from daily 10-year swap spreads. Another five variables were constructed as transformations of daily 10-year and two-year constant-maturity Treasury rates generated by the Salomon Smith Barney Treasury model. Daily values of the S&P 500 and NASDAQ equity indices were transformed into two variables, the JPY/$ rate into another, and the two lead Fed fund futures contracts were used to construct the final input variable. Thus, the total number of input variables to the model is twenty-five and the dependent variable for a given day, T, was the difference between the 10YSS on day T and that swap spread twelve business days later (i.e., at T+12).

To construct the learning and testing samples, data for the 26 variables (25 inputs and 1 output) were assembled from historical data recorded over a predetermined period of time; for example, from Jan. 26, 1990 to Aug. 7, 2001. For the initial model, data from Jan. 26, 1990 through Mar. 31, 1998, is used to train the network (i.e., the learning sample). To construct the learning sample, each case (25 independent variables and a dependent variable for a given date) from the learning sample period was ranked based on the magnitude of the 12-day change in 10YSS (the dependent variable). Roughly one-third of the cases (i.e. 616 out of a total of 1918) were found to have relatively small positive and negative values for the dependent variable; therefore, they were removed from the learning sample. This left 1302 cases in the learning sample, with 651 cases for which the 10YSS widened between T and T+12 and 651 cases for which the 10YSS narrowed. To test the model after it was constructed, the entire set of data from the subsequent quarter (i.e. 2Q98) was used, regardless of the magnitude of the 12-day change in the 10YSS. Thus, the test cases were out-of-sample with respect to the learning set and occurred later in time than any of the learning cases. After testing, the data from 2Q98 were added to the learning set, a new learning set with equal narrowing and widening cases was chosen by excluding the middle of the swap spread changes, and the process was repeated. The iterative learning, testing, and resampling procedure was repeated up to the end of the dataset on Aug. 7, 2001.

During training, values of market-related variables for a given trading day are presented to the 10YSS network model. The difference between the given output of the network and its 'desired' output (i.e., the actual move in 10YSS) is back-propagated by adjusting slightly each of the weights in the network in proportion to their ability to reduce the output error. The entire training set is presented repeatedly in random order until network performance stabilizes. The technique is called the gradient descent method of error back-propagation, as explained earlier. This technique is used to set the weights of a neural network, using as training data a set of daily technical indicators and the resulting future price change over a minimum sample period of eight years prior to the test dates.

As described above, the neural network model is really a series of quarterly models with a new set of network weights developed for each subsequent quarter over the four-year sample period, with each successive period incorporating for training an additional three months of data. Thus, although predictions for 1998 began with eight years of trailing data for training, by August of 2001, about 50% more cases are added in the training set by including the data from 1998 to 2001.

Recall that the objective is to predict the near-term directional movements of the 10-year swap spread. A model structure having 26 input nodes (the 25 input variables and a Bias variable always set to 1.0), several hidden nodes, and a single output node is implemented. The backpropagation method for adjusting the model coefficients and learning rates is used, just as it was used earlier to construct our models for the US Treasury prices, MnP/$ rate, and Mortgage OASs.. The model was trained using a minimum of 275,000 learning trials, with each trial consisting of a presentation of a learning case (sampled at random without replacement until the entire learning sample is exhausted and then restored once again). After the 275,000 trials, training was halted and the roughly 61 test cases from the next quarter were presented once to the network for scoring. The output of the model for each test case was a single real-numbered value between −0.2 and 1.2 and whose magnitude is presumably related to whether the 10YSS widened or narrowed.

The actual 10YSS neural network model includes not just one, but 13 of the structures similar (but not identical) to that shown in FIG. 1.[2] The weights for each of the 13 networks were generated using the same structure of nodes, learning data, number of trials, etc. However, the initial random weights assigned to the connections for each of the 13 networks were generated using different random seeds. This resulted in 13 models that yielded different output scores on various days. Although each of the 13 models produces a continuous output score, that output goes through a series of transformations that ultimately result in the generation of one of three signals: BUY (B), SELL (S), or NEUTRAL (N). For discussion purposes, the return on a trade of one-unit is designated as the number of basis points gained or lost on the 12-day change in the 10YSS from that on trade date T. The process of generating a model prediction on for a given day is as follows:

For a given trading day, values for the input variables are fed into the model and the signal is calculated;

If the signal is a B, one unit is added to the position, if it is an S, one unit is subtracted, and if the signal is N, no unit is added or subtracted from the position;

However, if any trades were done on the 12th-previous business day, that trade is unwound at the current day's close.

Thus, on any given day, the maximum number of units that one can trade under this rule is two units: one new position, and an unwinding of a previous one. Similarly, on any given day, the maximum size of our position could be long or short 12 units. The historical backtesting is performed using this method, while the model parameters are recalculated each quarter with additional data from the prior one.

For purposes of analyzing the results, the neural network can be thought of as including two models: one for predicting when 10-year swap spreads will widen, and one for predicting when swap spreads will narrow. To evaluate the model for predicting swap spread widening, the real-valued outputs of the neural network model were ordered from highest to lowest. Each value had associated with it a dependent variable value indicating whether (and how much) the swap spread widened or narrowed for that test case. For each ranked test case, it is examined whether its associated dependent variable was a "widen" (w) or a "narrow" (n). If the model were perfect, all the widening cases would have neural network scores greater than all the narrowing ones. However, if the model is not perfect, many narrowing cases can receive high neural network scores. The discriminatory power of less than perfect models can be evaluated by calculating the percentage of hits (i.e. percentage of all "widening" cases at or above the given rank) as a function of false alarms (i.e. percentage of all "narrowing" cases at or above the given rank). The results of such an analysis can be displayed in a plot called a receiver operating characteristic or ROC, as described above.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A computerized method for predicting a price movement in a financial market comprising:
   generating a plurality of signals, comprising:
      choosing an output variable indicative of price movements in a financial market;
      choosing a plurality of input variables that are market-related to the output variable;
      obtaining market data for the output variable and the input variables over a predetermined time period;
      constructing at least one training set of data from the obtained market data for the output variable and the input variables;
      calculating, by the use of a computer, a weight to be assigned to each of the input variables using the at least one training set of data to reflect a correlation between the output variable and the input variable as found in the obtained market data; and
      transforming the output variable into a score;
      generating a signal based on the value of that score to predict a next price movement in the financial market based on the calculating of the weights; and
   predicting the next price movement in the financial market based on a majority of signals being the same.

2. The computerized method of claim 1, wherein the choosing input variables comprises:
   choosing a first one of the plurality of input variables from an existing financial variable available in the financial market.

3. The computerized method of claim 2, wherein the choosing input variables comprises:
   calculating a variable from a plurality of existing financial variables in the financial market; and
   choosing the calculated variable as a second one of the plurality of input variables.

4. The computerized method of claim 1, wherein the at least one training set of data comprises a plurality of training sets of data.

5. The computerized method of claim 4, wherein the step of calculating comprises:
   calculating a weight to be assigned to each of the input variables using each of the plurality of training sets of data.

6. The computerized method of claim 5, wherein the step of generating comprises:
   generating a separate output value for the output variable to predict a next price movement in the financial market based on the calculated weights of each of the plurality of training sets of data.

7. The computerized method of claim 1, further comprising the step of sorting a plurality of scores.

8. The computerized method of claim 1, wherein the signal is selected from the group consisting of buy, sell, and neutral.

9. A computer-readable medium on which is encoded program code, the program code comprising:
   program code for generating a plurality of signals, comprising:
      program code for choosing an output variable indicative of price movements in a financial market;
      program code for choosing a plurality of input variables that are market-related to the output variable;

program code for obtaining market data for the output variable and the input variables over a predetermined time period;

program code for constructing at least one training set of data from the obtained market data for the output variable and the input variables;

program code for calculating a weight to be assigned to each of the input variables using the at least one training set of data to reflect a correlation between the output variable and the input variable as found in the obtained market data;

program code for transforming the output variable into a score; and program code for generating a signal based on the value of that score to predict a next price movement in the financial market based on the calculating of the weights; and program code for predicting the next price movement in the financial market based on a majority of the signals being the same.

10. The computer-readable medium of claim 9, wherein the program code for choosing input variables comprises:

program code for choosing a first one of the plurality of input variables from an existing financial variable available in the financial market.

11. The computer-readable medium of claim 10, wherein the program code for choosing input variables comprises:

program code for calculating a variable from a plurality of existing financial variables available in the financial market; and program code for choosing the calculated variable as a second one of the plurality of input variables.

12. The computer-readable medium of claim 9, wherein the at least one training set of data comprises a plurality of training sets of data.

13. The computer-readable medium of claim 12, wherein the program code for calculating:

program code for calculating a weight to be assigned to each of the input variables using each of the plurality of training sets of data.

14. The computer-readable medium of claim 13, wherein the program code for generating comprises:

program code for generating a separate signal for the output variable to predict a next price movement in the financial market based on the calculated weights of each of the plurality of training sets of data.

15. The computer-readable medium of claim 9, further comprising program code for sorting a plurality of scores.

16. The computer-readable medium of claim 9, wherein the signal is selected from the group consisting of buy, sell, and neutral.

* * * * *

UNITED STATES PATENT AND TRADEMARK OFFICE
CERTIFICATE OF CORRECTION

PATENT NO. : 7,529,703 B2  Page 1 of 1
APPLICATION NO. : 10/990960
DATED : May 5, 2009
INVENTOR(S) : Terry L. Benzschawel, Chi Dzeng and Gregory A. Berman It is certified that error appears in the above-identified patent and that said Letters Patent is hereby corrected as shown below:

IN THE CLAIMS SECTION -

In Column 16, Line 38 Claim 3, please change "variables in the financial market; and" to -- variables available in the financial market; and --

In Column 16, Line 51 Claim 6, please change "generating a separate output value for the output variable to" to -- generating a separate signal for the output variable to --

Signed and Sealed this

Ninth Day of June, 2009

JOHN DOLL
*Acting Director of the United States Patent and Trademark Office*